United States Patent [19]

Giles

[11] Patent Number: 4,458,255

[45] Date of Patent: Jul. 3, 1984

[54] APPARATUS FOR CAPPING AN INK JET PRINT HEAD

[75] Inventor: Robert R. Giles, Fort Collins, Colo.

[73] Assignee: Hewlett-Packard Company, Palo Alto, Calif.

[21] Appl. No.: 357,522

[22] Filed: Mar. 12, 1982

Related U.S. Application Data

[63] Continuation-in-part of Ser. No. 166,278, Jul. 7, 1980, abandoned.

[51] Int. Cl.³ .................. G01D 15/18

[52] U.S. Cl. .................. 346/140 R

[58] Field of Search .................. 346/140 R

[56] References Cited

U.S. PATENT DOCUMENTS

| | | | |
|---|---|---|---|
| 3,747,120 | 7/1973 | Stemme | 346/140 X |
| 4,106,032 | 8/1978 | Miura | 346/140 |
| 4,199,767 | 4/1980 | Campbell | 346/140 X |
| 4,223,324 | 9/1980 | Yamamori | 346/140 |

*Primary Examiner*—Joseph W. Hartary

*Attorney, Agent, or Firm*—Douglas A. Kundrat

[57] ABSTRACT

A piezoelectrically driven ink jet print head for ejecting ink droplets from an ink supply within the print head through a discharge channel onto a writing surface includes a shutter mechanism that may be electromechanically controlled during selected periods of time to seal the ink supply within the print head from the atmosphere and from a high speed laminar flow of air used to accelerate ejected ink droplets.

6 Claims, 2 Drawing Figures

APPARATUS FOR CAPPING AN INK JET PRINT HEAD

CROSS-REFERENCE TO RELATED APPLICATION

This is a continuation-in-part of my copending application serial No. 166,278, filed on July 7, 1980 now abandoned, and is also related to the subject matter of U.S. Pat. No. 3,747,120, entitled "Arrangement of Writing Mechanisms for Writing on Paper With a Colored Liquid", and to U.S. Pat. No. 4,106,032, entitled "Apparatus for Applying Liquid Droplets to a Surface by Using a High Speed Laminar Air Flow to Accelerate the Same". The subject matter of U.S. Pat. Nos. 3,747,120 and 4,106,032 is expressly incorporated herein by reference.

BACKGROUND OF THE INVENTION

The present invention relates generally to ink jet printers and more specifically to a piezoelectrically driven print head for applying ink droplets on demand to a writing surface upon which it is desired to print information. Exemplary of such print heads are those described in U.S. Pat. No. 3,747,120, entitled "Arrangement of Writing Mechanisms for Writing on Paper With a Colored Liquid", and in U.S. Pat. No. 4,106,032, entitled "Apparatus for Applying Liquid Droplets to a Surface by Using a High Speed Laminar Air Flow to Accelerate the Same". Prior art embodiments of ink jet printers have left the ink supply within the print head exposed to the atmosphere or the high speed laminar air flow at all times. While it is necessary during the specific period of time that printing is in progress that the discharge channel be open to allow ejection of the ink, continuous exposure of the ink at other times to the atmosphere or to the high speed laminar air flow is disadvantageous. One undesirable effect is that prolonged exposure tends to dry out the ink supply within the print head. The addition of humectants to the ink supply has been only partially successful as a solution to this problem.

Another undesirable effect of such exposure is dissolution of air into the ink supply. At the high rates at which piezoelectric print heads are driven, air dissolved in the ink supply tends to come out of solution in the form of bubbles, the presence of which in the ink supply seriously degrades performance of the print head. Chemical "getters" have in the past been added to the ink to prevent dissolved oxygen from coming out of solution. However, chemical "getters" have only a limited capacity to bind oxygen and, further, do not prevent bubble formation by gasses other than oxygen.

A further undesirable effect of continuous exposure of the ink supply within the print head to the atmosphere is that air bubbles will sometimes be ingested into the print head through the discharge channel and ink will, at other times, leak out through the discharge channel, depending upon the pressure differential between the ink supply and the atmosphere. In addition, the ink supply may become contaminated by the undesirable introduction of foreign particles through the discharge channel.

SUMMARY OF THE INVENTION

The present invention is directed to a capping mechanism to protect the ink supply contained within the print head of an ink jet printer from a high speed laminar flow of air used to accelerate ejected ink droplets and from outside contaminants during those periods of time in which printing operations are not being performed. The capping mechanism may be manually controlled to protect the ink supply during relatively long periods of shipping or storage, or may be electromechanically controlled so that capping occurs even during short periods of time such as that required to prepare a new sheet of paper for printing. Thus, the ink supply within the print head is only exposed during those periods of time in which printing operations are actually taking place.

In accordance with the illustrated preferred embodiment of the present invention, a capping mechanism is used in an ink jet print head that utilizes a high speed laminar air flow to accelerate the ejected ink droplets. The capping mechanism is electromechanically controlled to seal the ink supply from both the atmosphere and the high speed laminar flow of air during selected periods of time.

DESCRIPTION OF THE PREFERRED EMBODIMENT

Figure 1:
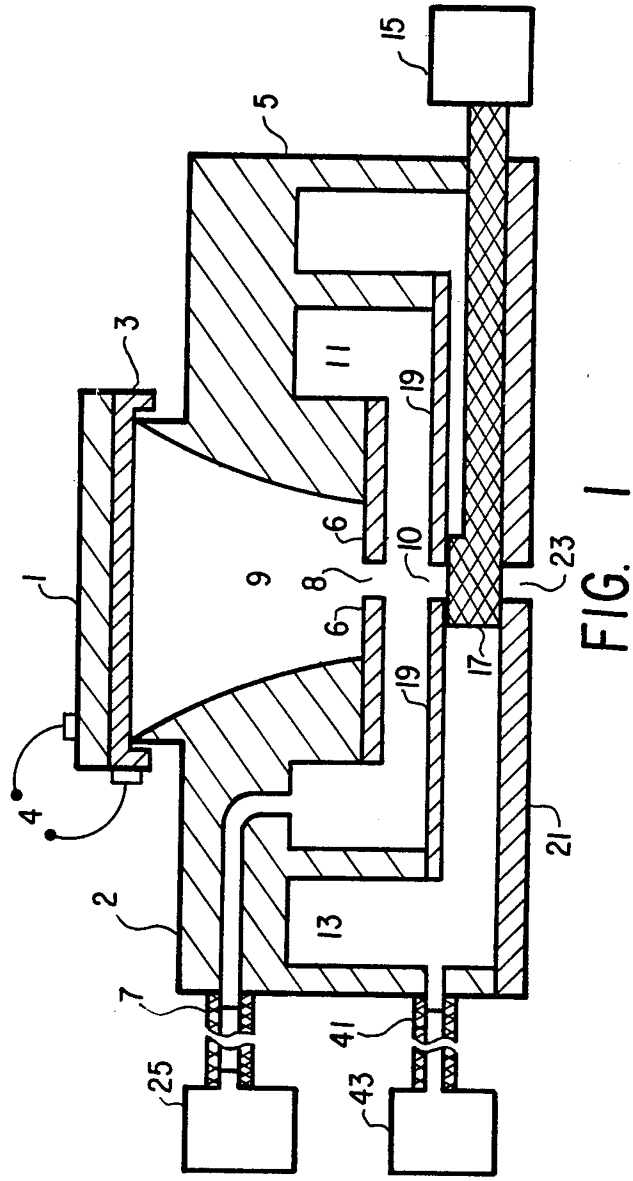
FIG. 1 is a cross-sectional view of an ink jet print head that includes a controllable shutter for capping the discharge channel, the controllable shutter being shown in the closed position.
Figure 2:
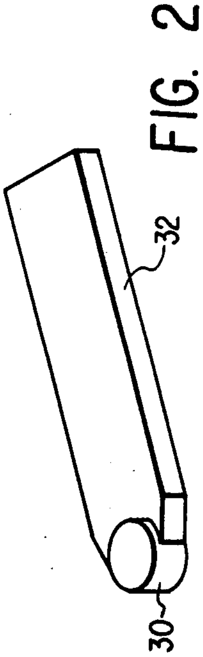
FIG. 2 is a detailed view of the controllable shutter employed in the print head of FIG. 1.

Referring now to FIG. 1, there is shown an ink jet print head 2 of the type described in U.S. Pat. Nos. 3,747,120 and 4,106,032. The print head 2 includes a housing 5, an inner ink chamber 9, an outer ink chamber 11, a top channel 8 connecting inner ink chamber 9 and outer ink chamber 11, an air chamber 13, a central channel 10 connecting outer ink chammber 11 with air chamber 13, and a discharge channel 23, axially aligned with top channel 8 and central channel 10, through which ink droplets are accelerated by a laminar flow of pressurized air for deposition on a surface to be printed. A diaphragm 3 and a piezoelectric crystal 1 are attached to housing 5 to form one end of inner ink chamber 9. A top plate 6 is mounted in a conventional manner to housing 5 at the other end of inner ink chamber 9 to form top channel 8. Piezoelectric crystal 1 is driven by electrical control pulses through a pair of wires 4 to flex diaphragm 3 so as to cause the ejection of ink droplets through discharge channel 23. An ink supply cartridge 25 is connected to outer ink chamber 11 by means of a tube 7. Outer ink chamber 11 is bounded by a slot plate 19 which is conventionally mounted to housing 5 and which forms central channel 10. A tank 43 is connected to air chamber 13 by means of a tube 41. Tank 43 contains a supply of pressurized air at a slightly higher pressure than the pressure at which the ink is stored within ink supply cartridge 25. A shutter 17, which may be better understood with reference to FIG. 2, is permitted to slide radially within air chamber 13. A base plate 21 is attached in a conventional manner to housing 5 to form discharge channel 23. A shutter controller 15, which may comprise any of a number of conventional electromechanical components such as a solenoid actuator, is provided to control the sliding operation of shutter 17.

Operation of print head 2 to produce ink droplets through discharge channel 23 may be understood with reference to U.S. Pat. Nos. 3,747,120 and 4,106,032.

During those periods of time when printing operations are in progress, the shutter 17 is maintained in a retracted position so that the flow of ink and the high speed laminar flow of air through discharge channel 23 is unimpeded. It is important that shutter 17, while in the retracted position, be so located within air chamber 13 that the laminar flow of pressurized air through discharge channel 23 is not disturbed. During those periods of time when printing operations are not in progress the shutter 17 is moved radially within air chamber 13 to a closed position as depicted in FIG. 1. When the shutter 17 is maintained in this closed position the flow of both ink and pressurized air through discharge channel 23 is obstructed. Shutter 17 may be electromechanically controlled by means of shutter controller 15, or may be moved between the retracted and closed positions manually.

Referring now to the shutter detail diagram of FIG. 2, shutter 17 comprises a shaft portion 32 and a head portion 30. The shaft portion 32 is constructed for slideable engagement within air chamber 13. The head portion 30 of shutter 17 is constructed so that when shutter 17 is in the closed position it forms an interference fit between the slot plate 19 and the base plate 21, thus effectively sealing the discharge channel 23.

I claim:

1. An ink jet print head for discharging ink droplets, the ink jet print head comprising:

a housing including an ink chamber for containing ink and an air chamber for containing pressurized air, said housing further including a first channel connecting the ink chamber with the air chamber and a discharge channel connecting the air chamber with the ambient atmosphere outside of the housing, said discharge channel being axially aligned with the first channel;

urging means for causing ink to be ejected from the ink chamber, said urging means being mounted to the housing and impinging upon the ink resident in the ink chamber; and a solid shutter for selectively blocking the first channel and the discharge channel, the solid shutter being positioned for slideable radial engagement within the air chamber such that in a first position both the first channel and the discharge channel are blocked and in a second position neither the first channel nor the discharge channel is blocked.

2. An ink jet print head as in claim 1, wherein the solid shutter creates an interference fit within the air chamber when in the first position.

3. An ink jet print head as in claim 2, wherein the urging means comprises a piezoelectric crystal.

4. An ink jet print head as in claim 3, further comprising electro-mechanical control means for controlling the position of the solid shutter.

5. An ink jet print head as in claim 4, wherein the urging means comprises a piezoelectric crystal.

6. An ink jet print head as in claim 1, wherein the urging means comprises a piezoelectric crystal.

* * * * *